Patented Sept. 6, 1949

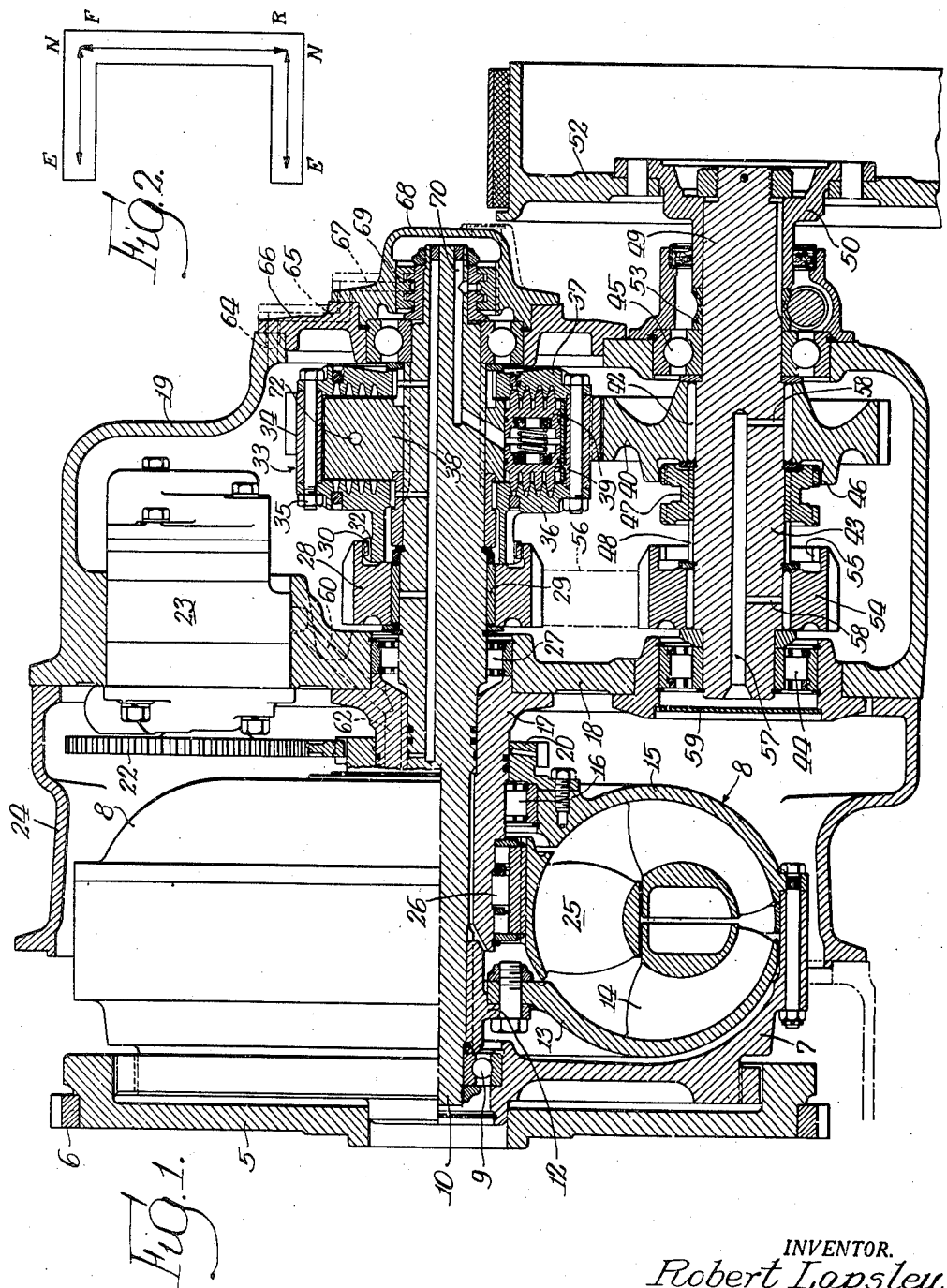

2,480,938

UNITED STATES PATENT OFFICE 2,480,938

TRANSMISSION

Robert Lapsley, Berrien Springs, Mich., assignor to Clark Equipment Company, Buchanan, Mich., a corporation of Michigan Application June 28, 1944, Serial No. 542,545

6 Claims. (Cl. 74—732)

This invention relates to transmissions, and more particularly is concerned with a combination torque converter and change speed gear transmission of simplified design providing single speed forward and reverse drive.

The invention is particularly adapted for use in connection with tractors and industrial trucks used for interplant hauling and in handling materials in manufacturing establishments, although it may also be employed for agricultural tractors and other purposes as well.

One of the primary objects of the present invention is to provide a transmission of this type in which the gears are in constant mesh and no shifting of the gears is required to change from one direction of drive to the other drive, this being accomplished by a sliding clutch element in combination with a gear which is internally clutched to the drive shaft leading from the converter through hydraulic means.

Another object of the present invention is to provide a simplified transmission which can be reduced in axial extent because of the elimination of necessity of shifting any gears, thereby providing a very compact small unit which can be easily assembled.

Still another object of the present invention is to provide a transmission of this design in which it is impossible to shift from forward to reverse drive without disengaging the change speed gearing from the drive shaft, this being accomplished automatically by a novel type of control means.

Other objects and advantages of the present invention will appear more fully from the following detailed description which, taken in conjunction with the accompanying drawing, will disclose to those skilled in the art the particular construction and operation of a preferred form of the present invention.

In the drawing,

Figure 1 is a vertical sectional view showing a transmission embodying the present invention; and Figure 2 is a diagrammatic illustration showing the control mechanism for shifting from forward to reverse drive.

Referring now in detail to Figure 1, there is provided the flywheel 5 having the starter gear 6 mounted thereon and having an internal gear coupled to the impeller portion 7 of the torque converter indicated generally at 8, this impeller portion having a hub mounted as by means of the bearing 9 upon the transmission or output shaft 10.

Adjacent the bearing 9 the shaft 10 is provided with a splined portion adapted to receive the hub 12 which has secured thereto the rotor member 13 having rotor blades 14. The opposite portion 15 of the impeller housing is supported in a bearing assembly 16 mounted on the sleeve 17 which in turn is bolted to the front wall 18 of the transmission housing 19.

Secured to the side of the impeller housing 15 is a gear member 20 which rotates with the impeller housing and consequently with the flywheel and drives a second gear 22 operating a pump 23 for developing hydraulic pressure for the control system of the transmission. The torque converter itself is enclosed within a housing 24 which is bolted to the front face of the transmission housing 19 and in turn is bolted to the flywheel housing of the vehicle engine or power plant.

Within the torque converter there is also provided a stator 25 mounted at its hub by means of a one-way brake 26 on the stationary sleeve 17.

From the description of the torque converter it will be apparent that the impeller consisting of the housings 7 and 15 operate to drive the rotor 13 which in turn applies torque to the shaft 10. The stator 25 is mounted so as to be restrained against reverse rotation but free to rotate in a forward direction.

The output shaft 10 from the torque converter is enlarged at the point where it enters the transmission housing 19 and is supported in the front wall of this housing by the bearing 27. Immediately adjacent the bearing 27 and within the housing 19 the shaft 10 is provided with the gear 28 rotatably mounted on a suitable bushing 29 carried by the shaft. The gear 28 is provided at one side with internal clutch teeth 30 adapted to be engaged by the clutch teeth 32 carried by a second gear indicated generally at 33. The gear 33 is a composite gear comprising the annular gear portion 34 to which are secured, by means of the studs 35, two side flange members 36 and 37, the member 36 having an axial hub extension on which the teeth 32 are formed. Disposed within the flanges 36 and 37 is an annular member having a hub portion 38 splined to the shaft 10 and provided at circumferentially spaced points with oppositely disposed pistons 39 having cooperating projecting flanges engaging in annular flanged recesses formed in the inner faces of the flanges 36 and 37. Upon introduction of fluid under pressure into the space between the two pistons 39 the pistons are expanded to clutch the flanges 36 and 37 and, consequently, the gear 34 to the hub 38 for conjoint rotation with the shaft 10.

The gear 34 is adapted to have constant meshing engagement with a gear 40 rotatably mounted as by bearings 42 upon a countershaft 43 suitably supported at the forward end of the transmission housing in the roller bearing assembly 44 and at the rear end of the housing in the ball bearing assembly 45. The gear 40 is provided with overhanging clutch teeth 46 adapted to be engaged by the sliding clutch member 47 mounted for axial sliding movement on the countershaft 43. Thus, in the position shown in Figure 1 the gear 40 is clutched to the countershaft 43 for conjoint rotation therewith, the countershaft being provided with a rearward extension 49 having a companion flange 50 secured thereon carrying the brake drum 52, there being a speedometer gear 53 interposed between the bearing 45 and the flange 50.

Also rotatably mounted on the countershaft 43 is a second gear 54 provided with internal clutch teeth 55 adapted to be coupled to the shaft 43 when the clutch member 47 is shifted to the left. The gear 54 has constant meshing engagement with an idler gear 56 mounted on a lay shaft disposed laterally between the shafts 10 and 43, and the gear 56 in turn is in constant meshing engagement with the gear 28 on the shaft 10.

To provide for adequate lubrication of the bearing by which the gears 54 and 40 are mounted on the shaft 43, there is provided in the shaft an axial passageway 57 with radial ports 58 leading outwardly to the bearing supports for the gears 40 and 54. The passageway 57 is adapted to receive lubricant through the bearing assembly 44 and is closed with respect to the torque converter housing by means of the closure plug 59.

Referring now to the pump 23 which is driven from the impeller housing member 15, this pump is adapted to develop fluid pressure, the fluid being transmitted through the passageway 60 in the housing 19 and through the passageway 62 in the sleeve 17 into the interior of the torque converter for filling the torque converter with fluid to provide operating torque. The pump is also adapted to develop a fluid pressure which, by means of a conduit (not shown), directs this fluid under pressure through passageway 64 in the rear end of the housing 19, thence downwardly through the passageway 65 in the bearing cap 66, and thence through passageway 67 in the closure cap 68 into a distributor member 69 whereby this oil or fluid under pressure is transmitted into the longitudinal passageway 70 formed in the shaft 10. From this passageway the fluid is transmitted through an opening in the hub 38 of the gear 33 into the space between the pistons 39 whereby the pistons are expanded to couple the gear 34 to the shaft 10. An annular passageway 72 provides for conjoint communication between all of the respective pairs of pistons spaced about the hub portion 38 of the gear.

When the control system admits fluid under pressure to the gear 34 this gear is automatically clutched to the shaft 10. Consequently, at this time the gear 34 rotates to drive the gear 40 and through the clutch to the connection conjointly drives the gear 28 which in turn, through the idler gear 56, drives the gear 54. Consequently, at any time that the clutch within the gear 33 is engaged, all gears in the transmission are being driven, depending upon the position of the sliding clutch 47. Therefore, the drive will be either in a forward or reverse direction on the shaft 43, depending upon whether the clutch member is shifted to the right-hand position as shown or to the left-hand position where it couples the gear 54 to the shaft 43.

In order to prevent shifting of the clutch member 47 while the gears are in driving connection with the shaft 10 with torque being transmitted therebetween, a novel type of gear shift control is provided so that the operator cannot shift from driving in a forward direction to driving in a reverse direction without first effecting declutching of the gear 33 from the shaft 10. This is shown diagrammatically in Figure 2 in which there is represented a gear shift lever control plate, the letters E indicating the position of the lever in the control plate when the clutch in the gear 33 is engaged. The letters N indicate the position of the lever when the gear 34 is free to rotate relative the shaft 10, and the letters F and R indicate forward and reverse position of the control lever. Consequently, from engaged position in a forward direction, that is, with the shaft 10 driving the gear 34 and in turn through gear 40 and clutch member 47 driving shaft 43, it is impossible to shift the clutch member 47 to reverse drive position without first moving the control lever to neutral position at which time the gear 34 becomes disengaged from the shaft 10, then shifting the sliding clutch 47 into reverse position which is the movement shown between the letters F and R in Figure 2, and thence reengaging the gear 34 with the shaft 10. It is therefore apparent that with this construction it is impossible to clash gears, since the main transmission gears are always in meshing engagement. Furthermore, the sliding clutch cannot be shifted unless all torque is relieved from the gearing by neutralizing the clutch members 39 within the gear 34. The sequence of action as provided by this shift control definitely prevents any driver from operating the vehicle in such manner as to clash the gears and insures a smooth application of power through the change speed gearing due to the smooth clutch engagement effected within the gear 34 coupling it to the driven shaft of the torque converter.

I am aware that a number of changes may be made in certain of the details herein shown and described, and I therefore do not intend to be limited except as defined by the scope and spirit of the appended claims.

I claim:

1. In a transmission, a torque convertor including an output shaft, axially spaced gears rotatably mounted on said shaft coupled for conjoint rotation, a countershaft, axially spaced gears rotatably mounted on said countershaft, one of said last-named gears being in constant meshing engagement with one of said first-named gears and the other of said countershaft gears being in constant meshing engagement through an intermediate idler with the other of said output shaft gears, fluid controlled means within one of said output shaft gears for coupling said output shaft gears to said shaft, and axially shiftable clutch means splined on said countershaft for selectively coupling either of said countershaft gears to the countershaft.

2. In a transmission having a torque convertor including a rotor, a shaft driven by said rotor, a pair of conjointly rotatable gears axially spaced on said shaft and rotatable relative thereto, a spaced countershaft, a pair of axially spaced gears journalled on said countershaft and constantly driven from said rotor shaft gears, and axially shiftable means intermediate said countershaft gears for selectively clutching each of said gears to said countershaft, one of said rotor shaft gears having an internal fluid pressure actuated mechanism for clutching it to said rotor shaft.

3. In combination, a torque convertor having a rotor driven shaft, a gear box into which said shaft extends, a countershaft in said gear box, forward and reverse gear trains in axially spaced relation on said shafts and in constant meshing engagement, said shafts being rotatable independently of said gear trains, means for selectively clutching either of said gear trains to said countershaft, and means including a fluid control clutch within one of said rotor shaft gears for simultaneously clutching said gear trains to said rotor driven shaft.

4. The combination of claim 3 wherein the gears on the rotor-driven shaft are coupled together for conjoint rotation.

5. The combination, with a torque converter having an output shaft, of axially spaced gears rotatably mounted on said shaft, means locking said gears for conjoint rotation, a countershaft, axially spaced gears rotatably mounted on said countershaft, one pair of said gears being in direct meshing engagement and the other pair of said gears being interconnected through an idler gear, axially shiftable means splined on said countershaft intermediate said gears for selectively coupling either of said countershaft gears to said shaft, and internal pressure-controlled means in one of said output shaft gears for coupling said gear to its shaft.

6. In combination, a first shaft driven from a power source, a countershaft, axially spaced rotatably mounted gear trains on said shafts, the gears on said first shaft being coupled for conjoint rotation, shiftable means between the gears on said countershaft for selectively coupling them to the shaft, and fluid pressure controlled means within one of said first shaft gears for coupling it to said shaft.

ROBERT LAPSLEY.

REFERENCES CITED

The following references are of record in the file of this patent:

UNITED STATES PATENTS

| Number | Name | Date |
| --- | --- | --- |
| 981,934 | Mais | Jan. 17, 1911 |
| 1,483,231 | Maynard | Feb. 12, 1924 |
| 1,788,899 | Tenney | Jan. 13, 1931 |
| 2,142,199 | Lysholm et al. | Jan. 3, 1939 |
| 2,333,682 | Schneider | Nov. 9, 1943 |

FOREIGN PATENTS

| Number | Country | Date |
| --- | --- | --- |
| 22,246 | Great Britain | 1907 |